(12) United States Patent
Boeen et al.

(10) Patent No.: US 11,126,398 B2
(45) Date of Patent: Sep. 21, 2021

(54) SMART SPEAKER

(71) Applicant: Listen AS, Oslo (NO)

(72) Inventors: Anders Boeen, Oslo (NO); Joachim Jacobsen, Oslo (NO); Helge Bod Vangen, Oslo (NO); Snorre Vevstad, Oslo (NO)

(73) Assignee: Listen AS, Oslo (NO)

( * ) Notice: Subject to any disclaimer, the term of this patent is extended or adjusted under 35 U.S.C. 154(b) by 0 days.

(21) Appl. No.: 16/816,584

(22) Filed: Mar. 12, 2020

(65) Prior Publication Data

US 2020/0293270 A1 Sep. 17, 2020

Related U.S. Application Data

(60) Provisional application No. 62/817,640, filed on Mar. 13, 2019.

(51) Int. Cl.
| | | |
|---|---|---|
| *H04R 29/00* | (2006.01) | |
| *G06F 3/16* | (2006.01) | |
| *G06N 3/10* | (2006.01) | |
| *G06N 3/08* | (2006.01) | |

(52) U.S. Cl.
CPC .............. *G06F 3/165* (2013.01); *G06N 3/10* (2013.01); *G06N 3/08* (2013.01)

(58) Field of Classification Search
CPC .............. G06F 3/165; G06N 3/10; G06N 3/08
USPC ...................................................... 381/57, 56
See application file for complete search history.

(56) References Cited

U.S. PATENT DOCUMENTS

| | | | | |
|---|---|---|---|---|
| 6,493,687 | B1* | 12/2002 | Wu ........................ | G08B 13/04 340/541 |
| 6,766,295 | B1* | 7/2004 | Murveit ................... | G10L 15/30 379/88.01 |
| 7,020,292 | B1* | 3/2006 | Heubel ................... | H03G 3/342 379/93.29 |
| 2004/0230420 | A1* | 11/2004 | Kadambe ................ | G10L 15/07 704/205 |
| 2015/0185161 | A1* | 7/2015 | Gettings ................. | G01J 5/025 73/865.8 |
| 2015/0302728 | A1* | 10/2015 | Gettings ................. | G08B 3/10 340/506 |
| 2015/0358718 | A1 | 12/2015 | Kaller et al. | |
| 2016/0165336 | A1 | 6/2016 | Di Censo et al. | |
| 2016/0188285 | A1* | 6/2016 | Luk ........................ | G06F 3/165 700/94 |
| 2017/0075422 | A1 | 3/2017 | Sun et al. | |
| 2017/0295272 | A1 | 10/2017 | Gan et al. | |
| 2018/0286372 | A1* | 10/2018 | Beckman ............... | G05D 27/02 |
| 2019/0045298 | A1 | 2/2019 | Klemme et al. | |
| 2020/0043519 | A1* | 2/2020 | Ramos ................... | G10L 15/18 |
| 2020/0081683 | A1 | 3/2020 | Cremer et al. | |
| 2020/0092644 | A1* | 3/2020 | Alders ................... | H04R 1/403 |

(Continued)

*Primary Examiner* — William J Deane, Jr.
(74) *Attorney, Agent, or Firm* — Fish & Richardson P.C.

(57) ABSTRACT

Embodiments relate to an electronic device such a smart speaker. The electronic device may include a sensor to identify an environmental condition related to a location in which the electronic device is positioned. The electronic device may further include a processor to identify, based on a neural network, a sound-related parameter related to the environmental condition. The electronic device may further include a speaker to generate a sound based on the sound-related parameter. Other embodiments may be described or claimed.

25 Claims, 8 Drawing Sheets

(56) References Cited

U.S. PATENT DOCUMENTS

| | | | |
|---|---|---|---|
| 2020/0118544 A1* | 4/2020 | Lee | G10L 15/005 |
| 2020/0151519 A1* | 5/2020 | Anushiravani | G06K 9/629 |
| 2020/0152036 A1* | 5/2020 | Safavi | G08B 21/02 |
| 2020/0156912 A1* | 5/2020 | Carlei | B62B 3/108 |
| 2020/0167631 A1* | 5/2020 | Rezgui | G06F 8/30 |
| 2020/0184985 A1* | 6/2020 | Nesta | H04S 3/008 |
| 2020/0184991 A1* | 6/2020 | Cleve | H04S 7/40 |
| 2020/0186378 A1* | 6/2020 | Six | G06F 3/04817 |
| 2020/0241834 A1 | 7/2020 | Boeen et al. | |
| 2020/0260198 A1 | 8/2020 | Andersen et al. | |
| 2020/0285249 A1* | 9/2020 | Woods | G05D 1/0246 |
| 2021/0106236 A1* | 4/2021 | Tran | A61B 5/291 |
| 2021/0141597 A1* | 5/2021 | Atarot | A61B 34/30 |

\* cited by examiner

SMART SPEAKER

CROSS-REFERENCE TO RELATED APPLICATION

This application claims the benefit of U.S. Provisional Patent Application 62/817,640, filed on Mar. 13, 2019, the subject matter of which is hereby incorporated by reference in its entirety.

BACKGROUND

Efficient conversations with artificial intelligence (AI) personal assistants may be challenging in noisy environments. For example, the AI may require very distinct speech to be able to interpret instructions given by a user of the personal assistant correctly. Additionally, in specific environments, it may be difficult for a user to hear vocal or other sounds generated by the AI personal assistant.

DETAILED DESCRIPTION

Figure 1:
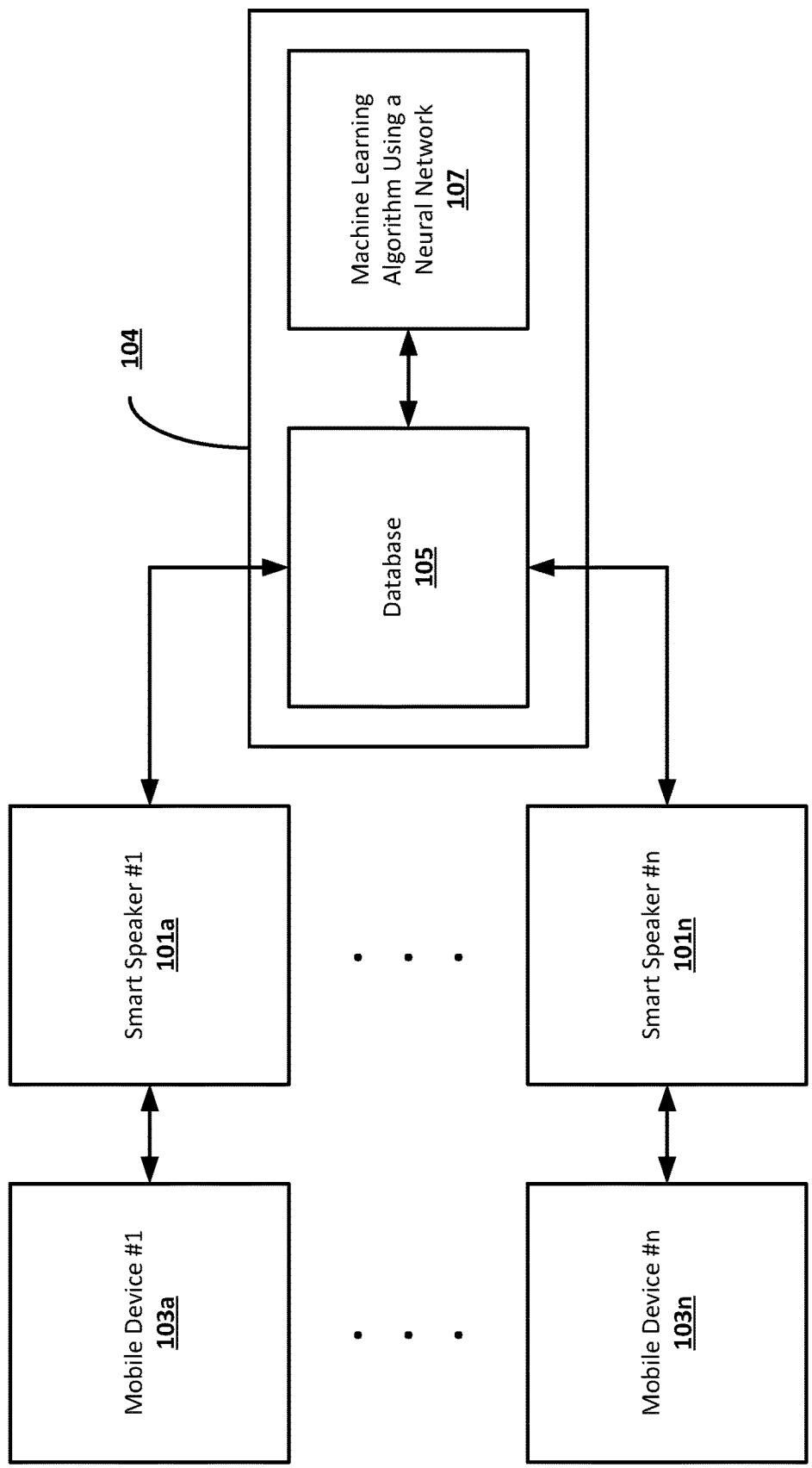
FIG. 1 depicts a simplified view of a system architecture related to the use of a smart speaker, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

Generally, embodiments herein relate to smart speakers. More particularly, embodiments relate to the enablement of smart speakers to improve voice commands in a noisy environment. The smart speakers may also collect sound environment data, or other data or information related to the environment in which the speakers are located (e.g., sound data, air quality data, vibrational data, ultraviolet (UV) exposure data, etc.) Based on the collected data, an AI (i.e., a neural network) may process the sounds in one or more ways. For example, the neural network may predict sound health based on the volume of the collected sounds, predict a safety parameter (e.g., a parameter which may be related to the sound of breaking glass, screams, fire-alarms, etc.), predict air quality, or send a notification based on the sound classification.

Specifically, in some embodiments, the smart speaker may be enabled to amplify frequencies received by the smart speaker to improve interpretation of the user's command by the smart speaker. For example, by recording sound samples of a person's voice, a neural network (which may be located on the smart speaker, in a database with which the smart speaker is in communication, or distributed between the smart speaker and the database) may be able to detect that a specific user is talking to the smart speaker and apply a compensation filter. In some embodiments, as noted previously, the smart speaker may further be configured to identify a second compensation filter (volume, frequency, etc.) which may be applied to a sound that is generated by the speaker in response to the command.

Additionally, in some embodiments, the smart speaker may be able to direct a sound coming from the smart speaker. For example, the smart speaker may have the use of beamforming, may have multiple directional speakers, may have a mechanically rotating speaker, may have a speaker enclosure with motorized gates to direct a sound, etc. This may allow the speaker to direct the sound or voice reply to a location of the user. The location of the user may be identified by, for example, a microphone array of the smart speaker (or a plurality of networked speakers).

Additionally, some embodiments may relate to a situation wherein a user's environment is relatively loud. To protect the user's hearing health, it may be desirable to reduce exposure to too many sounds, sounds with a certain intensity, sounds over a given time frame, etc. The exposure to loud environments or sounds may, for example, cause the user to become mentally exhausted or damage the user's hearing. Some embodiments herein may have a user-observable indicator such as an indicator light, a display, a sound, etc. which may inform the user of how much noise they are exposed to when they are in the same environment as a smart speaker.

Turning to more specific embodiments or aspects, one embodiment may relate to a platform of hardware or software with algorithms running on multiple devices. In some embodiments, the algorithm may be distributed across a number of electronic devices (e.g., a smart speaker, a remote server, and a mobile phone), whereas in other embodiments the algorithm may be primarily or wholly located on a single electronic device (e.g., the smart speaker).

The smart speaker may include one or more microphones, one or more speakers, one or more batteries, one or more sensors, one or more processing units, and one or more transmit or receive modules (e.g., a transceiver or separate transmit and receive modules) which are able to transmit or receive wireless audio signals. The sensors may be, for example, a proximity sensor, a capacitive sensor, an accelerometer, a gyroscope, a magnetometer, a carbon dioxide ($CO_2$) sensor, a total volatile organic compound (TVOC) sensor, a humidity sensor, a temperature sensor, an air pressure sensor, or some other type of sensor. The processing units may be, for example, a processing unit such as a central processing unit (CPU), a single or multi-core processor, a core of a processor, a general processing unit (GPU) or some other type of processing unit. The wireless audio signals may be, for example, a wireless signal such as a WIFI signal, a Bluetooth® signal, or a cellular signal such as a third generation (3G), fourth generation (4G), or fifth generation (5G) signal, or some other type of wireless signal. In some embodiments, the transceiver and the type of wireless signal may be based on whether the smart speaker is communicating with the server through the mobile device, or whether the smart speaker is configured to communicate directly with a cellular tower and bypass the mobile device. The sound output from the algorithm may be output by a speaker of the smart speaker, or it may be an analog output or digital signal sent to another device (e.g., another smart speaker), or some other type of sound output. Other variations may be present in other embodiments.

In some embodiments, the algorithm may be receptive to inputs provided by a user through a user-accessible interface such as a graphical user interface (GUI), a voice command, a motion command, an eye command, or some other type of command. In some embodiments, the user-accessible interface may at least partially be an interface of the mobile device, whereas in other embodiments the user-accessible interface may be at least partially separate from the mobile device (e.g., at least partially located on the smart speaker).

Based on sounds detected in the environment by one or more of the microphones of the smart speaker, the user may be able to select how much they would like to attenuate, remove, amplify, enhance, or other alter one or more sounds such as specific noises, specific frequencies, specific voices, etc. For example, in some embodiments a user may have a specific profile that they prefer in terms of equalizer settings, volume settings, etc. for playback of a sound from the smart speaker. For example, the user may have an age or health-related condition which may affect their hearing, and so the user may prefer the speaker to enhance certain sounds or frequencies. Such enhancement may change dependent on factors of the environment such as humidity, room size, noise level, etc.

In one particular embodiment, the mobile phone, the smart speaker, or both may include an executable application wherein a user GUI may be provided to adjust the output of the smart speaker. The application may enable the user to transmit provided feedback to a database located in a server. On the server, a neural network may be running, and the neural network may predict sound parameters based on the user feedback and data from the database. The sound parameters may then be transmitted back to the smart speaker (either directly or through the mobile phone) and used by the smart speaker to generate an audio signal as described above.

In some embodiments, the smart speaker may be configured to dynamically reduce voice in playback of music. By doing so, the smart speaker may enable a karaoke function. Specifically, with the use of a neural network and classification of voices (e.g., types of voices, particular frequencies, etc.) a sound processor unit of the smart speaker may include control parameters which may allow for the attenuation or removal of voice from music.

In one embodiment, the smart speaker may record ambient sound level and correlate the sound level with geo-location data (e.g., which may be identified by the mobile device), and transmit the sound information and the geo-location information to the server, where it may be stored in a server-located database. With the correlated sound level and the geo-location information, a noise-pollution map may be created from information from one or more smart speakers. With this map, users may be informed about their daily exposure of sound level, receive suggestions of places with lower sound levels, identify roads that include loud construction or vehicle noise, etc. Noise maps may also be used by institutions such as governments for planning purposes such as building new schools, homes, daycares, parks, etc. In some embodiments, sensors such as a $CO_2$ sensor, a TVOC sensor, a humidity sensor, a temperature sensor, a particulate matter sensor, etc. may allow the smart speaker to provide feedback related to whether a user is exposed to air pollution. In some embodiments, the smart speaker may include one or more indicators (e.g., a light, a display, an audio warning, etc.) which may display daily exposure of sound and indicate whether a user is in a safe range.

In one embodiment, the smart speaker may include one or more sensors such as microphones to detect sound, accelerometers to detect vibration, a camera (which may be configured to detect a visible spectrum, an infrared spectrum, or some other spectrum) to detect movement, etc. In this embodiment, the sensor(s) may be configured to record ambient sounds, detect specific sounds (e.g., glass breaking, fire alarm, a voice at an increased pitch or volume, etc.), detect vibration which could indicate movement, sense movement through the camera, etc. to identify a safety or security-related condition, or some other condition. The smart speaker may then be configured to direct a notification to a recipient such as a user, an alarm company, a fire or police department, medical help, neighbors, etc.

As a specific embodiment, the sound recordings may be processed by the neural network, either on the smart speaker or on a server remote from the smart speaker, to detect a parameter such as a frequency of sound. If the frequency significantly increases or decreases, then a notification could be sent to a specific recipient. An example use case could relate to a sound that a baby or small child makes, and an increase in the sound could indicate distress while a lack of the sound could indicate a safety or health-related issue.

As another specific embodiment, the sound recordings may be processed by the neural network in conjunction with the video camera or data from other sensors (e.g., an accelerometer) to generate an "activity score." The activity score may be a metric of how much activity is in the vicinity of the smart speaker. The activity score could be used for a number of scenarios. For example, a home may have a certain level of activity when an occupant is away. An increase in the activity score could indicate that there is an intruder or an emergency situation. The smart speaker may then alert the occupant, a neighbor, emergency services, etc. Alternatively, the smart speaker could be used to monitor an individual such as an elderly person or a small child. A significant decrease in the activity score could indicate that the individual needed help. The smart speaker may then alert the occupant, a neighbor, emergency services, etc. Other use cases may be envisioned for the activity score.

In one embodiment the smart speaker may include a mechanism or technique which may affect or alter a directional component of the sound generated by the speaker. For example, the smart speaker may be configured to use beamforming, multiple directional speakers, a mechanically rotating speaker, a speaker enclosure with motorized gates, etc. These mechanisms or techniques may direct the sound and voice to the location of the user talking to the speaker based on the location detected by one or more microphones of the smart speaker. By changing a direction (either a physical direction or a perceived direction) of the sound coming from the smart speaker, clarity, speech intelligibility, and volume of the smart speaker may be increased.

In one embodiment the smart speaker may include one or more sensors as noted above. Such sensors may be configured to detect an environmental condition of an environment in which the smart speaker is placed, e.g. humidity or temperature. The environmental condition may be used to change a sound characteristic of a sound generated by the speaker. For example, humidity or temperature may affect how sound waves propagate through the air, so in some embodiments the neural network (either on the speaker or on a server to which the speaker is communicatively coupled) may be configured to change a frequency or volume of a sound that is to be generated by the speaker based on the environmental condition.

The architecture of the network may include a plurality of elements, as depicted in FIG. 1. Specifically, FIG. 1 depicts a simplified view of a system architecture that includes a plurality of smart speakers, in accordance with various embodiments. The system architecture may include a number of smart speakers such as smart speakers 101a-101n. It will be understood that the designation "n" is intended to refer to an un-specified number of smart speakers which may be present in the system. The smart speakers 101a-101n may be, for example, a stand-alone physical device with a single or multiple speakers, a speaker integrated into another device (e.g., as part of a television), or some other type of physical device. In some embodiments, different ones of the different smart speakers 101a-101n may have different form factors. For example, one of the smart speakers may be a smart speaker with a single speaker, while another of the smart speakers may include a plurality of speakers, be integrated into a television, etc.

Respective ones of the smart speakers 101a-101n may be communicatively coupled with a mobile device 103a-103n. In the embodiment of FIG. 1, the mobile device may be a mobile phone. In other embodiments, one or more of the mobile devices may be some other type of mobile device such as a smartwatch, a personal digital assistant (PDA), or some other type of mobile device. In some embodiments, a smart speaker 101a-101n may be communicatively coupled with a respective mobile device 103a-103n through a short-range wireless protocol such as Bluetooth, WIFI, or some other wireless protocol. In some embodiments, one or more of the smart speakers 101a-101n may be communicatively coupled with a mobile device 103a-103n through a wired connection (e.g., such as a headphone jack or some other wired connection that is removable or hardwired). In some embodiments, one or more of the smart speakers 101a-101n may share a form factor with a mobile device such that a separate mobile device is un-necessary. In other words, one or more of the smart speakers 101a-101n may include a cellular wireless transceiver and processor such that the mobile phone is un-necessary. Examples of an integrated smart speaker and mobile device may include a tablet, a laptop computer, etc. In this embodiment, the smart speaker may be configured to communicate directly with a cellular tower via a protocol such as a 3G, 4G, 5G, or some other type of wireless cellular protocol.

The smart speakers 101a-101n may be communicatively coupled with a server 104 which may include a database 105 and a neural network 107. The smart speakers 101a-101n may be communicatively coupled with the server 104 by way of one or more wireless protocols such as a cellular protocol as described above, or some other wireless protocol. Generally, the database 105 may store information related to one or more parameters, weights, historical audio data, historical geographic data, etc. The neural network 107 may perform one or more calculations related to the information stored in the database 105 to provide one or more audio parameters to the smart speaker(s) 101a-101n.

Through the smart speakers 101a-101n, the mobile devices 103a-103n may also be communicatively coupled with the server 104. However, it will be understood that in other embodiments one or more of the mobile devices 103a-103n may be coupled with the server 104, and the one or more of the smart speakers 101a-101n may be coupled with the server 104 through a mobile device. In some embodiments one or more of the smart speakers 101a-101n and the mobile devices 103a-103n may be coupled with the server 104 in parallel with one another, rather than sequentially as depicted in FIG. 1.

Although the server 104 is depicted as a unitary element, in some embodiments the server 104 may include a plurality of networked servers, a plurality of server blades, etc. Such an embodiment may be referred to as a "server farm." Additionally, it will be understood that the database 105 may be stored on a plurality of non-transitory memories such as a double data rate (DDR) memory, a nonvolatile memory (NVM), or some other type of memory. Similarly, it will be understood that the neural network 107 may be enabled across one or more processors/CPUs/GPUs/processor cores/etc. of the one or more servers 104. Typically, such an embodiment may be scalable such that the neural network 107, the database 105, and the server 104 may be expanded or contracted based on the degree of need of such an embodiment. In some embodiments, the neural network 107 may be spread across various of the elements of the system architecture and at least part of the neural network 107 may be offloaded from the server 104 and stored on a mobile device, a smart speaker, both, etc. The portion of the neural network 107 may additionally or alternatively be executed, run, etc. on the mobile device/smart speaker/etc. Similarly, in some embodiments the database 105 may be at least partially offloaded to a mobile device, a smart speaker, etc.

Typically, in operation, a mobile device (e.g., mobile device 103a) may collect data such as user feedback (e.g., through an application on the mobile device), user data, geo-location data, a timestamp, user feedback data, a unique identifier (ID) which may be random or fixed, etc. Similarly, the smart speaker (e.g., smart speaker 101a) may collect data during usage of sound level, sensor data from sensors on the smart speaker, statistics from the sound algorithm running on the smart speaker, sound data (e.g., recorded sound clips), etc. The data from the mobile device 103a and the smart speaker 101a may be provided to the server 104 and, more particularly, to the database 105 and the neural network 107 of the server 104. In some embodiments, the data from the mobile device 103a may be appended to a packet of the data from the smart speaker 101a and transmitted to the server 104, however in other embodiments the data may be transmitted in other formats or data streams.

The neural network 107 may process one or more elements of the data. For example, the neural network 107 may identify an environment type based on data such as sound recordings, geo-location data, user feedback, etc. For example, the neural network 107 may identify whether a smart speaker is in an individual's apartment, in a coffee shop, whether the environment is quiet or noisy (e.g., a party is occurring), etc. Additionally or alternatively, the neural network 107 may classify sound types in the recorded sound. For example, the neural network 107 may classify certain sounds as glass breaking, screams, a baby crying, particular instruments, animal sounds, a male voice, a female voice, etc. Based on the sound types recorded, the neural network 107 may predict one or more audio parameters for use by the smart speaker. The parameters may include, for example, beamforming parameters, equalizer or volume settings, etc. In some embodiments, the neural network 107 may also predict sound levels in which the smart speaker may be located based on data such as geo-location, time, etc. These predicted sound levels may be used to create a noise map or a graph, as described above. Information related to the sound levels or the audio parameters may then be transmitted to the smart speaker where it may be used to, for example, provide an indication to the user of sound data (as described above) or change a parameter of a sound that is to be played back by the smart speaker.

It will be noted that the embodiment of FIG. 1 is intended as one embodiment, and other embodiments may vary from that depicted. For example, in some embodiments the neural network 107 may be wholly or partially operated on a smart speaker. For example, the smart speaker may be enabled to perform the sound type recognition, identify control parameters, etc. Such actions may be performed separately from, or in conjunction with, a neural network 107 located on the server 104.

Figure 2:
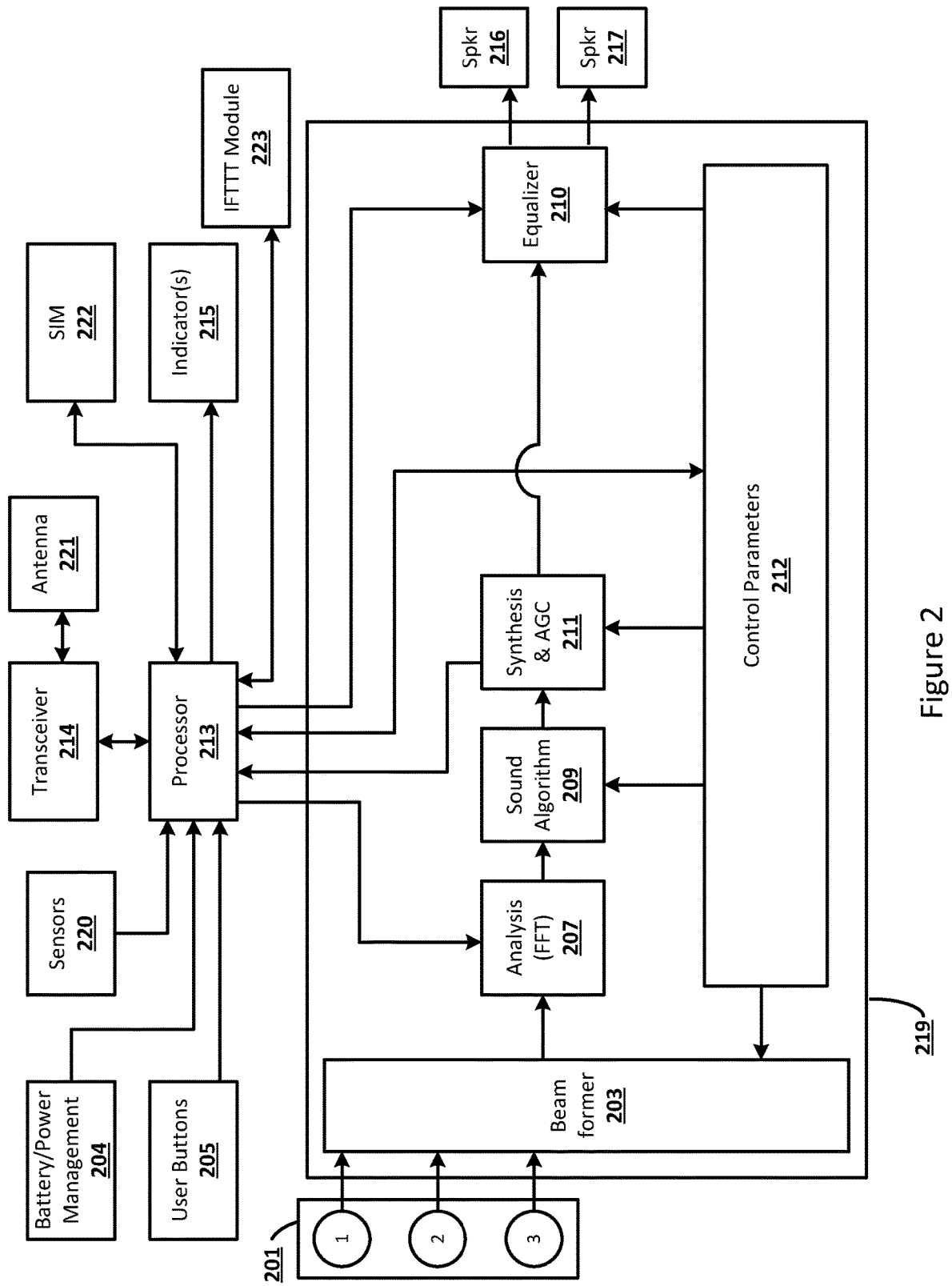
FIG. 2 depicts a simplified view of elements of a smart speaker, in accordance with various embodiments.

FIG. 2 depicts a simplified view of a smart speaker, in accordance with various embodiments. It will be understood that the embodiment of FIG. 2 is intended as an example embodiment, and other embodiments may vary from that depicted in FIG. 2. For example, in some embodiments the smart speaker may include more or fewer elements than depicted, elements in a different configuration, etc. In some embodiments all of the elements in FIG. 2 may be located in a single housing, as depicted, whereas in other embodiments the elements may be distributed across two or more physical housings while remaining communicatively coupled to one another. The smart speaker may be similar to, for example, one of smart speakers 101a-101n.

The smart speaker may include one or more microphones 201. As shown, the smart speaker may include a total of three microphones (respectively labeled "1," "2," and "3"). In other embodiments the smart speaker may include more or fewer microphones than depicted. In some embodiments, the microphones may each be of a same type (e.g., directional, cardioid, omnidirectional) while in other embodiments one or more of the microphones may be of a different type than the others. Similarly, one or more of the microphones may be attuned for certain frequencies, etc. The array of microphones 201 depicted in FIG. 2 may be desirable so that the microphones 201 may be used to triangulate the location of a user of the smart speaker based on an audio signal.

The smart speaker may further include one or more speakers 216 and 217. The speakers 216 or 217 may be used to output sound. In various embodiments, the speakers 216 or 217 may be of the same type as one another (e.g., attuned to a specific frequency, a specific direction, etc.) whereas in other embodiments one of the speakers may be different than the other (e.g., speaker 216 may be attuned to high frequencies whereas speaker 217 is attuned to mid-range or low frequencies). As noted, in some embodiments the speakers may be configured to perform beamforming, may be mechanically rotatable, etc.

The smart speaker may further include a processor 213 which may be, for example, a CPU, a GPU, a processing core, etc. as described above. Generally, the processor 213 may control the smart speaker and interface to a mobile device such as mobile devices 103a-103n, or a server such as server 104 as described above.

The smart speaker may further include a sound processor unit 219 which may include a variety of modules as will be described in detail below. Generally, an audio signal may traverse between the different modules of the sound processor 219 (e.g., from the microphones 201 to the speakers 216/217) as depicted in FIG. 2 and as described below. The sound processor unit 219 may be composed of or otherwise include an application-specific integrated circuit (ASIC), a digital signal processor (DSP), a processor (CPU, GPU, processor core, etc.), or some other type of logic or processing unit. At a high level, the sound processor unit 219 may run the algorithm used to process the signals from the microphones 201, sound signals received from the processor 213, or other audio signals. The processed signals may be output to the processor 213, the speakers 216/217, or some other element of the smart speaker. More generally, the sound processor unit 219 may be optimized to run one or more elements of the neural network 107, predict output of neural network, or calculate weights used for the sound processing. In some embodiments, the sound processor unit 219 and the processor 213 may be implemented on a same chip/packages/physical structures, or they may be implemented on different chips/packages/physical structures. In some embodiments, as previously noted, the neural network may be at least partially implemented on the sound processor unit 219. In other embodiments, the neural network may be additionally or alternatively at least partially implemented on the processor 213.

The microphones 201 may be communicatively coupled with a beamforming module 203 of the sound processing unit 219. The beamforming module 203 may calculate one or more parameters for use by the speakers 216 or 217 during generation and transmission of an audio signal by speakers 216 or 217. The parameters may be fixed control parameters or adaptive beamforming parameters that adapt to the environment. The adaptive beamforming parameters may be based on information collected from one or more sensors of the smart speaker, user feedback, information received from the processor 213, information received from a server 104, etc. The beamforming module may operate in time domain or frequency domain.

The sound processing unit 219 may further include an analysis module 207 which may be configured to, for example, convert a signal from the time domain to the frequency domain. Specifically, the analysis module 207 may be configured to perform a fast Fourier transform (FFT) or some other operation which may convert from the time domain to the frequency domain.

The sound processing unit 219 may further include a sound algorithm module 209. The sound algorithm module 209 may be configured to process the sound provided by the microphones 201 to reduce noise, enhance voice, etc. Specifically, the sound algorithm module 209 may process the sound in accordance with, for example, control parameters 212 (explained in further detail below).

The sound processing unit 219 may further include a synthesis and automatic gain control (AGC) module 211. The AGC module 211 may convert the signal from the frequency domain to the time domain. The time domain signal may then be output to an equalizer 210 for further processing. In some embodiments, the AGC module 211 may further output the signal to a processor 213 for further processing, storage, transmission to mobile phone, transmission to the server, etc.

The sound processing unit 219 may further include an equalizer 210. The equalizer 210 may assist with compensation for hearing loss by highlighting one or more frequencies for amplification or attenuation. In some embodiments, the equalizer 210 may serve as volume control. The equalizer 210 may operate in accordance with the control parameters 212. The signal may then be output from the equalizer 210 to the speakers 216/217 for sound generation and transmission. It will be noted that although the equalizer 210 is depicted in FIG. 2 as operating in the time domain (e.g., after processing by the AGC module 211), in some embodiments the equalizer 210 may operate in the frequency domain and be located in the signal path prior to the AGC module 211.

The sound processing unit 219 may further include a storage which may store control parameters 212. The storage may be, for example, a volatile memory, a NVM, or some other type of memory. For example, the storage may be a flash card, static random-access memory (SRAM), a DDR, etc. The control parameters may be used to control or otherwise provide information to various modules such as the beamforming module 203, the sound algorithm module 209, the equalizer 210, the synthesis and AGC module 211, or some other module.

The control parameters 212 may be communicatively coupled with, and controlled by, the processor 213. In some embodiments, the processor 213 may provide information or parameters to the control parameters 212 which may then be used during operation of the smart speaker. In some embodiments, the parameters may be considered "fixed" while in other embodiments the parameters may be dynamically updated by the processor 213 based on changing conditions or factors of the smart speaker (e.g., information provided by various sensors of the smart speaker, information received from or produced by the neural network, etc.). In some embodiments, although the processor 213 is only depicted as directly coupled with the control parameters 212 of the sound processing unit 219, in other embodiments the processor 213 may be directly communicatively coupled with one or more other modules of the sound processing unit 219.

The smart speaker may further include a battery/power-management module 204. The battery/power-management module 204 may be or include a power source such as a single battery (e.g., a lithium-ion battery or some other type of battery), or it may include one or more supporting circuitry elements such as voltage regulators, a battery gauge, a battery charging system, etc. In some embodiments, the battery/power-management module 204 may include circuitry to process a current or voltage received from a power outlet to which the smart speaker is coupled.

The smart speaker may include one or more user-accessible buttons 205. The buttons 205 may be, for example, located on the side or top of the smart speaker. The buttons 205 may be used by a user to change modes of the smart speaker, provide feedback, etc. The feedback from the buttons 205 may be part of the user-provided feedback that is transmitted to the server 104 as described above.

The smart speaker may further include one or more transceiver modules 214 coupled with one or more antennas 221. The transceiver modules 214 may include, for example, separate transmit or receive modules (not shown) that are configured to transmit or receive one or more wireless signals as discussed herein. In other embodiments, the transceiver module 214 may be a unitary module configured to both transmit and receive wireless signals. The antenna(s) 221 may be physical elements configured to transmit or receive the wireless signals over the air. The smart speaker may further include a subscriber identity module (SIM) module 222 which may be communicatively coupled either directly or indirectly with the transceiver module 214. The SIM module 222 may be, for example, an embedded SIM (eSIM), an integrated SIM (iSIM), or some other type of module that allows for, facilitates, or otherwise supports wireless communication.

The smart speaker may further include one or more indicators 215. The indicator(s) 215 may be configured to display a level of sound pressure (e.g., a sound level as measured in decibels (dB)) in the environment. In some embodiments, the indicator(s) 215 may be configured to display this information based on a current level or a level with a given time period such as a day, a week, a month, etc. The indicator(s) 215 may be, for example, a light-emitting diode (LED), a multi-color LED, a graphical display, a voice message, an audio signal, etc. In some embodiments, the indicator(s) 215 may also act as an air quality indicator as described herein. For example, the air quality indicator may similar display information related to current air quality or air quality over a given time period. In some embodiments, the user buttons 205 and the indicator(s) 215 may be implemented as a combined unit such as a touchscreen or some other type of user-interactive display.

The smart speaker may further include one or more sensors 220 which may be, for example, one or more of the sensors discussed above such as a gyroscope, a magnetometer, an air quality sensor, or some other sensor as described above.

The smart speaker may further include an if this then that (IFTTT) module 223 that is communicatively coupled with the processor 213. The IFTTT module 223 may be configured to enable the smart speaker to include functionality in accordance with the IFTTT protocol.

It will be understood that while various elements and, particularly, various modules of the sound processing unit 219 are depicted as separate modules, in some embodiments certain elements or modules may be elements of a single physical structure. For example, the various modules may be implemented as software on a single processor, as separate processing chips, as firmware, or as some combination thereof.

Figure 3:
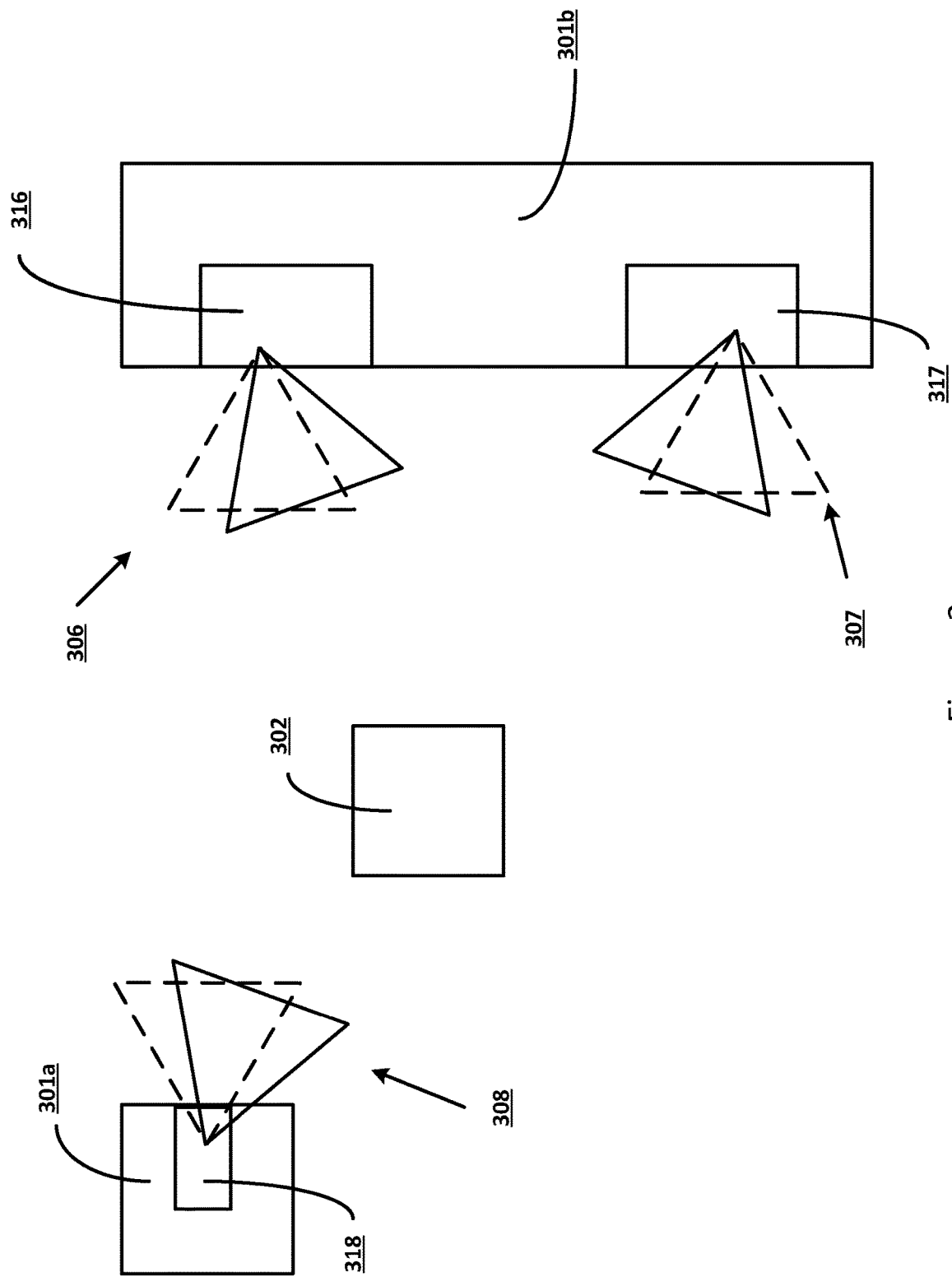
FIG. 3 depicts an example of directional compensation by a smart speaker, in accordance with various embodiments.

As noted, the smart speakers may be configured to alter a direction of the sound that they generate. For example, the smart speakers, and particularly speakers thereof, may be configured to beamform the sound in different directions, may have a rotatable speaker, may have a speaker with a movable enclosure which may direct the sound, etc. An example of such a configuration is depicted in FIG. 3. Specifically, FIG. 3 depicts an example of directional compensation by a smart speaker, in accordance with various embodiments.

Specifically, FIG. 3 depicts a plurality of smart speakers 301a and 301b, which may be respectively similar to one of smart speakers 101a-101n, or the system depicted in FIG. 2. Each of the smart speakers 301a and 301b may include one or more speakers 316, 317, and 318, which may be respectively similar to speakers 216 or 217 of FIG. 2. A user 302 may be positioned adjacent to one or more of the smart speakers 301a/301b as shown.

As shown, the speakers 316/317/318 may be configured to produce sound 306/307/308. The sound 306/307/308 is represented as a triangle with a dashed line 307. However, it may be desirable for the speakers 306/307/308 to direct the sound to the user 302. As shown, the sound 306/307/308 may be shifted so that it is directed to the user 302 as represented by the solid triangular lines. As noted, the redirection of the sound 306/307/308 may be performed by beamforming (e.g., by identifying specific time delays at which sounds may be broadcast so that they reach the user 302 at a specific time and provide constructive interference which may amplify the sounds). Additionally or alternatively, the redirection may occur by physically rotating one or more of the speakers 316/317/318 within the smart speaker 301a/301b. Additionally or alternatively, the redirection may occur by shifting baffles of the speakers 316/317/318 or the smart speakers 301a/301b to physically redirect the sound in a desired direction. In other embodiments the sound may additionally or alternatively be directed in accordance with a different technique or physical structure.

Figure 4:
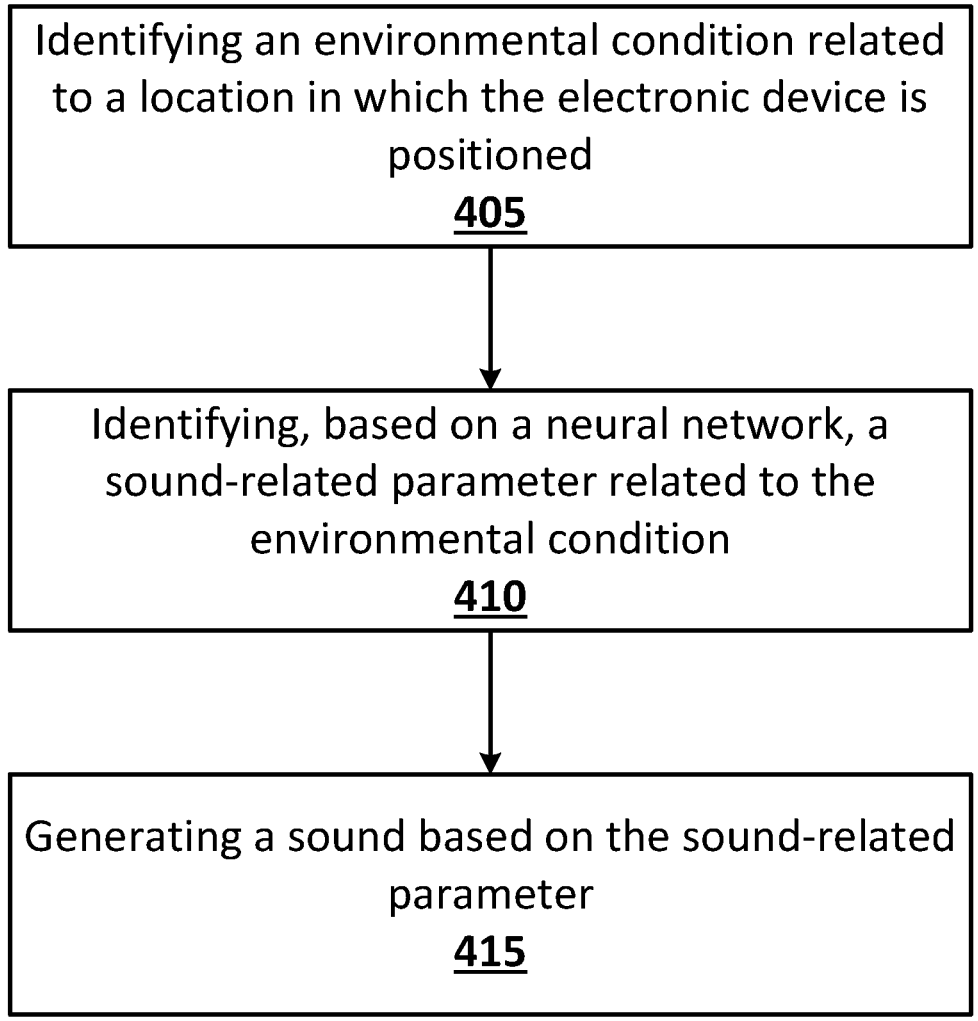
FIG. 4 depicts an example technique by which a smart speaker may be used, in accordance with various embodiments.

FIG. 4 depicts an example technique by which a smart speaker may be used, in accordance with various embodiments. Generally, FIG. 4 may relate to how the smart speaker (e.g., similar to smart speaker 101a-101n or the smart speaker of FIG. 2) may adapt or alter a sound that is to be generated based on an environmental condition in which the smart speaker is located. As used herein, an environmental condition may relate to a noise condition (e.g., a type or volume of noise) in the environment, a characteristic related to a user of the smart speaker, a temperature or humidity-related condition, an acoustic characteristic of the location (e.g., a size of the room, the amount of reverberation detected by the smart speaker, etc.)

The technique may include identifying, at 405, an environmental condition related to a location in which the electronic device is positioned. The identification may occur by a sound processor unit such as sound processor unit 219, a processor such as processor 213, or some other element of the smart speaker. Generally, the identification may be performed by, or facilitated by, a neural network that is at least partially running on an element of the smart speaker as described above.

As noted, the previously, the environmental condition may relate to temperature, humidity, noise level, noise type, etc. In some embodiments, the environmental condition may relate to an age-related characteristic of a user of the smart speaker, a gender-related characteristic of the user of the smart speaker, a specific identity of the user of the smart speaker, etc. In some embodiments, the environmental condition may be identified based on geo-location or timestamp data (e.g., a known location is known to have a specific characteristic related to sound quality), audio detected by the microphone of the smart speaker, etc. In some embodiments, the environmental condition may relate to a location of the user. For example, the environmental condition may be based on audio picked up by a plurality of microphones of the smart speaker, which may be used to triangulate the location of the speaker as described above with respect to FIG. 3.

The technique may further include identifying, at 410, based on the neural network, a sound-related parameter related to the environmental condition. The sound-related parameter may be, for example, an equalizer or volume setting related to the location. For example, if the location is a coffeeshop with a known noise profile, then a particular equalizer or volume setting may be applied.

Additionally or alternatively, the sound-related parameter may be an equalizer or volume setting related to a user of the smart speaker. For example, the smart speaker may identify, based on an audio command of a user, the user's age or gender, and apply a particular equalization or volume parameter. In some embodiments, the smart speaker may identify the identity of the user (for example, based on a previous training algorithm) and identify one or more parameters related to that specific user. For example, the user may have pre-set specific parameters in a user profile, which may be identified by the smart speaker. As a specific example, if a user has hearing loss, then the user may choose to amplify specific frequencies or volumes, and those choices may be stored in the user profile.

Additionally or alternatively, the sound-related parameter may relate to a directional parameter of a sound that is to be generated by the smart speaker. For example, the sound-related parameter may relate to a beamforming setting, a rotation of the speaker, a rotation of a baffle of the speaker, etc.

The technique may then include generating, at 415, a sound based on the sound-related parameter. The generation of the sound may include application (e.g., by the equalizer 210) of the equalization or volume parameter, application of a beamforming parameter, physically rotating a speaker or an element of the smart speaker, etc.

Figure 5:
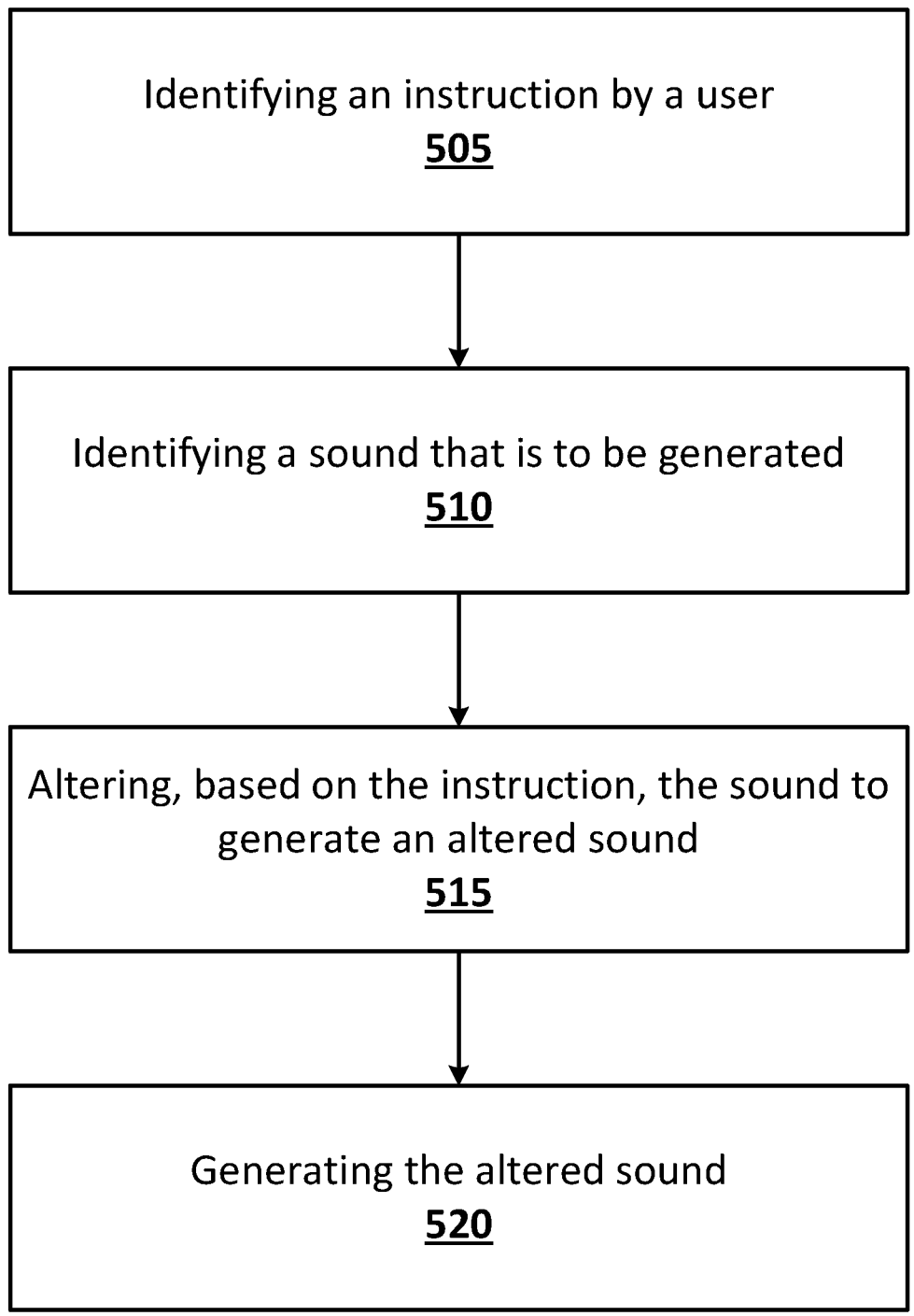
FIG. 5 depicts an alternative example technique by which a smart speaker may be used, in accordance with various embodiments.

FIG. 5 depicts an alternative example technique by which a smart speaker may be used, in accordance with various embodiments. Specifically, FIG. 5 may relate to an example use case where a user may cause the smart speaker to alter a sound that is to be generated to, for example, reduce the volume of a portion of the sound, accentuate a certain portion of the sound, etc. This technique may enable, for example, a so-called "karaoke" mode.

The technique may include identifying, at 505, an instruction by a user. The identifying may be performed by, for example, the processor 213, the sound processor unit 219, etc. The instruction may be, for example, a verbal instruction that is identified by a microphone such as microphone 201. Additionally or alternatively, the instruction may be an instruction that is input by the user to an application running on a mobile device that is communicatively coupled with the speaker, input on the speaker itself using one or more of the user buttons 205, etc.

The technique may further include identifying, at 510, a sound that is to be generated. The identifying may similarly be performed by the processor 213, the sound processor unit 219, etc. The sound may be, for example, a song that is to be played by a speaker of the smart speaker. Additionally or alternatively, the sound may be a language based or other audio-based sound that is to be generated and produced by the smart speaker (e.g., a natural-language based response to a query by the user).

The technique may further include altering, at 515, based on the instruction identified at 505, the sound identified at 510 to generate an altered sound. The altering may be performed by the sound processor unit 219 and, particularly, by the equalizer 210 or some other element of the sound processor unit 219. The altering may take the form of changing an equalization setting of the sound, changing a directional parameter of the speaker, changing a volume of the sound, changing a volume of a portion of the sound, etc.

The technique may then include generating, at 520, the altered sound. Specifically, the technique may include generating the altered sound by speakers such as speakers 216 or 217.

Figure 6:
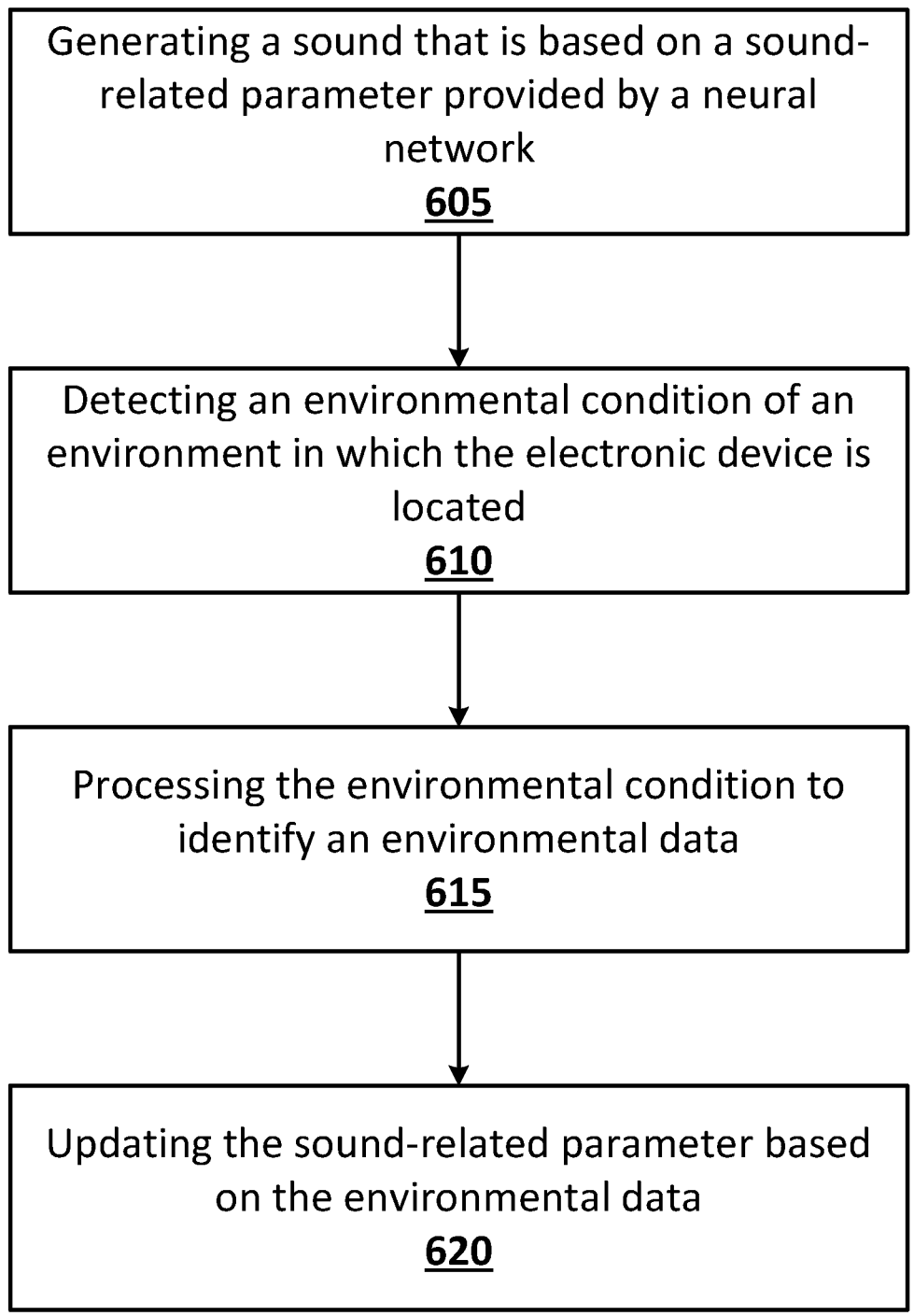
FIG. 6 depicts an alternative example technique by which a smart speaker may be used, in accordance with various embodiments.

FIG. 6 depicts an alternative example technique by which a smart speaker may be used, in accordance with various embodiments. As previously noted, the smart speaker may use one or more control parameters that are based on data uploaded to the database 105 and processed by the neural network 107. More specifically, the neural network may include or otherwise provide weights which may be used by the smart speaker to alter a sound. In some embodiments, it may be desirable to update the database, the neural network, the control parameters, or some combination thereof.

The technique may include generating, at 605, a sound that is based on a sound-related parameter provided by a neural network. The sound may be, for example, the sound generated at 415 or 520. The sound-related parameter may be one or more weights which may be used to generate the sound.

The technique may further include detecting, at 610, an environmental condition of an environment in which the electronic device is located. The environmental condition may be, for example, one or more of the environmental conditions described above with respect to element 405. For example, the environmental condition may be a temperature, a humidity, a noise level, a UV level, etc.

The technique may further include processing, at 615, the environmental condition to identify an environmental data. The processing may include, for example processing an environmental condition such as a recorded sound to identify an environmental data such as an indication of a noise level in the location. The processing may be performed by an element of the smart speaker (e.g., the processor 213 or the sound processor unit 219). In some embodiments, the processing may include transmitting an indication of the environmental condition to a server such as server 104 where the environmental condition may be processed to identify the environmental data.

The technique may then include updating, at 620, the sound-related parameter based on the environmental data. In some embodiments, the updating may be performed by an element of the server 104 to calculate a new sound-related parameter (e.g., new weights) which may then be transmitted to the smart speaker. For example, if the environmental data indicates a change in the noise level at a location of the smart speaker, then a volume-related sound parameter (or weights which may be used to affect the volume of the sound of the smart speaker) may be updated based on that change in noise level. In other embodiments, the updating may be performed by an element of the smart speaker to change a control parameter such as the control parameters stored at 212.

Figure 7:
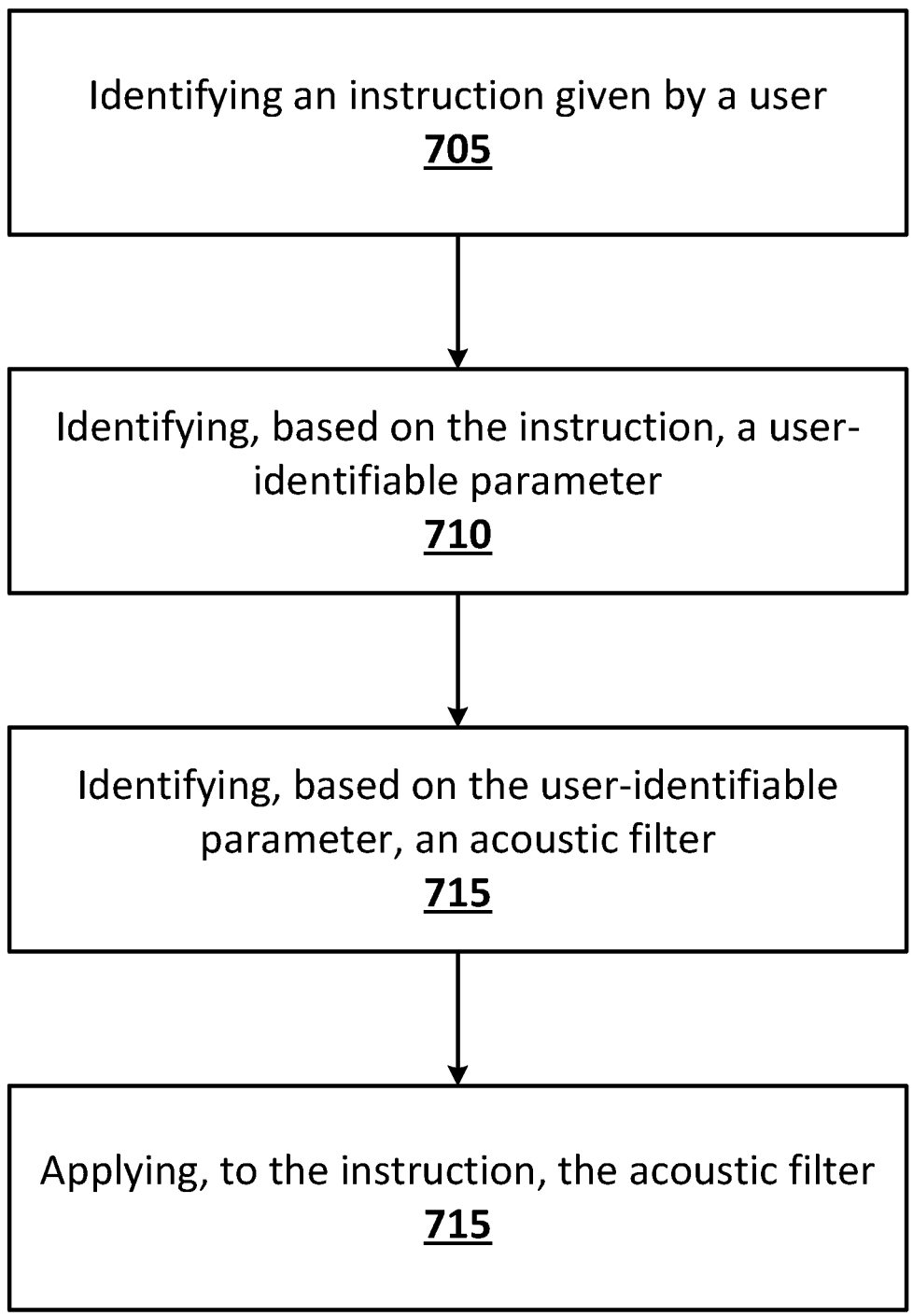
FIG. 7 depicts an alternative example technique by which a smart speaker may be used, in accordance with various embodiments.

FIG. 7 depicts an alternative example technique by which a smart speaker may be used, in accordance with various embodiments. In particular, in some embodiments the smart speaker, and particularly a neural network running on the smart speaker, maybe configured to apply one or more filters to enhance an audio (e.g., spoken) instruction provided by a user.

The technique may include identifying, at 705, an instruction provided by a user. The instruction may be a spoken instruction such as to play a specific song, to send a text message, to make a phone call, to ask for a weather report, etc. The instruction may be recorded by a microphone such as one of microphones 201, and identified by the processor 213 of an element of the sound processing unit 219.

The technique may further include identifying, at 710, based on the instruction, a user-identifiable parameter. For example, the processor 213 or the sound processing unit 219 may identify, based on the recorded instruction, a parameter such as a user's identity, a user's gender, a user's age, etc. The identification may be based on comparison of the instruction to a database of previously-recorded instructions (e.g., audio clips of a user's voice provided during a training sequence, audio clips acquired or provided during initial setup of the smart speaker or the server 104, etc.)

The technique may further include identifying, based on the user-identifiable parameter, an acoustic filter. The acoustic filter may include, for example, a particular equalization setting. For example, a male voice with a relatively lower pitch may have different frequencies than a higher-pitched female voice. Similarly, an adult's voice and a child's voice may have different frequencies. An equalization setting that is calibrated to the different pitches or frequencies may be identified which may be used to highlight or remove specific frequencies, which may significantly increase the clarity of the provided instruction. The acoustic filter may then be applied, at 715, to the instruction. In this manner, the instruction may be significantly clarified before it is processed by the smart speaker, which may result in a clearer instruction with a higher degree of clarity.

It will be understood that the described techniques of FIGS. 4-7 are intended as highly simplified examples. Although particular examples of certain concepts may be described herein, it will be understood that the examples are intended as non-limiting examples, and other embodiments may have additional or alternative factors or considerations. It will also be understood that the elements depicted with respect to FIGS. 4-7 may occur in a different order than depicted (e.g., concurrently with one another, one element may occur prior to, or subsequent to, another element, etc.) It will also be understood that in other embodiments the described techniques may have more or fewer elements than depicted.

Figure 8:
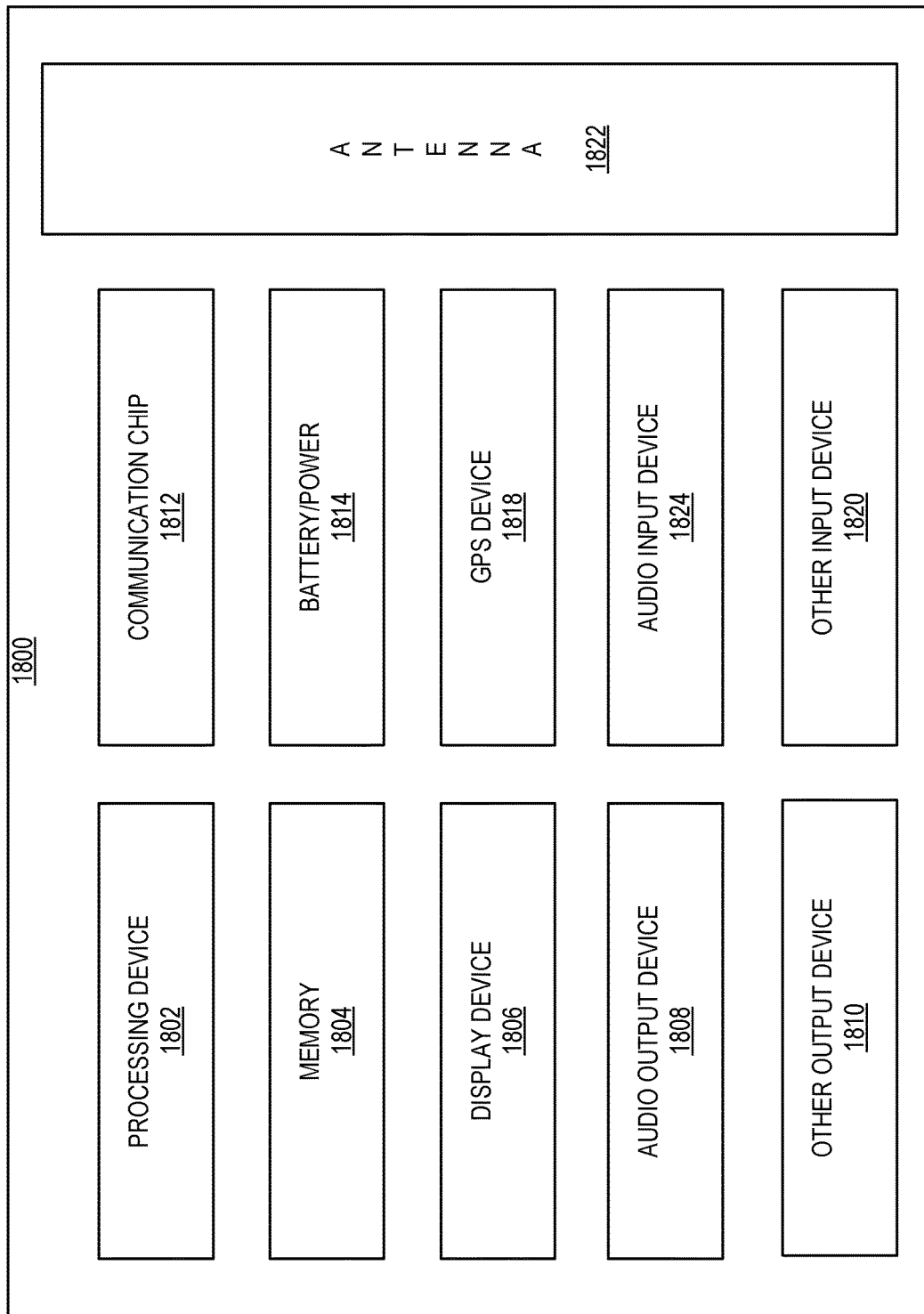
FIG. 8 is a block diagram of elements of an example smart speaker, in accordance with various embodiments.

FIG. 8 is a block diagram of an example electrical device 1800 that may be or include a mobile device such as mobile devices 103*a*-103*n*, a smart speaker such as smart speakers 101*a*-101*n*, or a server 104. Specifically, the electrical device 1800 may include elements of or related to a neural network such as that discussed herein, in accordance with any of the embodiments disclosed herein. A number of components are illustrated in FIG. 8 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 8, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more DSPs, ASICs, field-programmable gate arrays (FPGAs), CPUs, GPUs, cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including WIFI (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as WIFI or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a LED display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a PDA, an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

EXAMPLES OF VARIOUS EMBODIMENTS

Example 1 includes a smart speaker comprising: at least one microphone array; at least one speaker; at least one sensor; at least one sound processing unit configured to enhancing voice, reduce specified sounds defined as noises and enhance specified sounds of interest; at least one RF Transceivers.

Example 2 includes the Smart Speaker of example 1, or some other example herein, configured to collecting user data, sensor data, geo-location, date, time, record sounds and send the data via at least one RF transceiver to a server either through a mobile phone/internet connect device, through a virtual assistant or directly from the internet connected smart speaker to a database on the server;

Example 3 includes the Smart Speaker of example 1, or some other example herein, comprising a sound processing unit configured to being dynamically updated (parameters and algorithm code) from RF transceiver connected to internet, external internet connected personal device, mobile phone, server, virtual assistant.

Example 4 includes the Smart Speaker of example 1, or some other example herein, configured to perform firmware update from external internet connected personal device, mobile phone, server, virtual assistant or RF transceiver connected to internet.

Example 5 includes a method of operating a smart speaker, comprising: processing data from a database, by a neural network that predict "type of sound environment" (e.g. social party, dancing, conversation, dinner party, glass breaking, screams, walking, baby cry . . . ), predict sound level, predict optimal parameters for sound processing unit in the Smart Speaker of example 1, or some other example herein, including but not limited to voice enhancement, sound and noise reduction, beamforming, specific noise enhancement.

Example 6 includes a method of example 5, or some other example herein, comprising running the neural network on, one server, multiple servers for scalability, a personal computer, a virtual assistant, a mobile phone, personal devices connected to smart speaker, but without internet connection.

Example 7 includes the Smart Speaker of example 1, or some other example herein, comprising a sound level indicator located on the smart speaker configured to display the level of sound pressure (dB) in the environment and/or display the user daily, weekly, monthly sound exposure.

Example 8 includes the Smart Speaker of example 7, or some other example herein, wherein the indicator is selected from the list of at least one LEDs, at least one multi-color LED, a display (Social warning), voice message, sounds.

Example 9 includes the Smart Speaker of example 1, or some other example herein, comprising one or multiple accelerometer configured to measure vibration from foot steps together with microphones measuring sounds from foot steps Example 10 includes the Smart Speaker of example 9, or some other example herein, wherein the measuring of foot steps can be used as activity notification sent to the cloud, turn on music, alarm notification, turn on light, etc.

Example 11 includes the Smart Speaker of example 1, or some other example herein, wherein the placement of multiple microphones located in an array on the smart speaker to maximize the beamforming ability and beamform towards the person talking towards the smart speaker.

Example 12 includes the Smart Speaker of example 11, or some other example herein, wherein the Beamforming can be updated from external personal device, mobile phone, server, virtual assistant, but not limited to Example 13 includes the method of example 5, or some other example herein, comprising selecting music and playlist based on the type of sound environment predicted by the neural network in example 5.

Example 14 includes the method of operating a smart speaker, comprising: Dynamically Adjusting an equalizer in a sound processing unit compensating for hearing loss by raising amplification in the frequencies affected by an individual user's hearing loss.

Example 15 includes the method of example 14, or some other example herein, further comprising dynamically updating the equalizer during music listening based on prediction by a neural network trained by user data, App settings, sound processing unit control parameter settings, user age, and gender.

Example 16 includes the method of example 14, or some other example herein, further comprising dynamically updating the equalizer during user voice interaction with the smart speaker to compensate for hearing loss based on prediction by a neural network trained by user data, App settings, sound processing unit control parameter settings, user age, and gender.

Example 17 includes the Smart Speaker of example 1, or some other example herein, configured to collect the geo-location from the mobile phone connected through Bluetooth or enquire from internet the internet providers geo-location.

Example 18 includes the method of example 5, or some other example herein, comprising training the neural network based on online sound data with labels, custom recorded data with labels, user collected data with labels, user collected data from the smart speaker and mobile App.

Example 19 includes the Smart Speaker of example 18, or some other example herein, where in user collected data contains user App Settings, user feedback, geo-location, Date, Time, sound Clips, Unique ID (fixed or random), sound algorithm statistics, air Quality Sensor Data, sound level.

Example 20 includes the method of collecting user feedback comprising collecting feedback on the sound quality and experience, sending the feedback to the database, wherein the collection of the feedback is performed by at least one of the following: feedback through a mobile phone App, Physical button(s) on smart speaker, voice controlled feedback, answering voice message either through voice, button push, App acknowledgement or motion movements recorded by one or more accelerometers.

Example 21 includes a system, comprising: at least one smart speaker; at least one internet connected personal devices, mobile phones or smart speaker with internet connection; at least one server; at least one database for storing data, parameters, user feedback and sound recordings; at least one neural networks configured to predicting parameters, sound classifications; and at least one Sound Processing Units.

Example 22 includes a method of operating the system of example 21, or some other example herein, comprising: sending data from mobile phone/personal device, then to smart speaker, then to a database, then through at least one neural network, then a result is sent from the at least one neural network to the database, then to the smart speaker.

Example 23 includes a method of creating a noise map, comprising: Collecting noise level with one or multiple microphones in a smart speaker, sending the noise level to a database with geo-location from the mobile phone; If the smart speaker have internet connection and received the GPS coordinates from a GPS or mobile device the noise level and geo-location can be sent directly to the database.

Example 24 includes the method of example 23, or some other example herein, comprising: Creating a noise map by using the collected data in the database and interpolation between data points or utilize a neural network to fill in missing coverage.

Example 25 includes a method of improving speech recognition by reducing background noise from microphones and enhancing the voice, by using a neural network that has been trained to remove everything except voices. Output from the neural network will be sent to the processor that forward it to the voice assistant in the cloud.

Example 26 includes a method of improving speech intelligibility by learning the users voice through AI and then apply hearing curves to the voice assistant's response played out on the smart speaker that will compensating for user hearing loss.

Example 27 includes the Smart Speaker of example 1, or some other example herein, wherein air pollution sensors is mounted on the smart speaker to measure the air quality.

Example 28 includes the Smart Speaker of example 27, or some other example herein, wherein the air pollution Sensor is selected from the list of at least one: Air pressure, nitric oxide (NO), nitrogen dioxide ($NO_2$), ozone ($O_3$), carbon dioxide ($CO_2$), carbon monoxide (CO), methane ($CH_4$), Particulate matter, TVOCs, humidity, or temperature.

Example 29 includes the Smart Speaker of example 1, or some other example herein, wherein a microphone array is mounted on the smart speaker to measure orientation of incoming voice commands and steer the speakers towards the person speaking.

Example 30 includes the Smart Speaker of example 29, or some other example herein, wherein the Directional Speaker is selected from the list of at least one: Speakers direction placed in each quadrant, multiple speakers placed in an array to create beamforming, mechanical rotating speaker, speaker located in a enclosure with motorized gates that can open towards the direction of person speaking.

Example 31 includes the Smart Speaker of example 1, or some other example herein, wherein an eSIM/iSIM is mounted on the smart speaker to enable data transmission across mobile broadband such as LTE M1.

Example 32 includes the Smart Speaker of example 1, or some other example herein, comprising an air pollution indicator located on the smart speaker configured to display the level of air pollution in the environment.

Example 33 includes the Smart Speaker of example 32, or some other example herein, wherein the indicator is selected from the list of at least one LEDs, at least one multi-color LED, a display (Environment warning), voice commands, warning sounds.

Example 34 includes a method of operating the Smart Speaker of example 1, or some other example herein, wherein user feedback is the main way of adjusting the smart speaker sound processor unit.

Example 35 includes the method of example 34, or some other example herein, wherein the user feedback is transmitted up to a database located in a server. On the server a neural network is running in realtime and predicting the optimal sound processor unit parameters based on the user feedback stored in the database. The predicted parameters from the neural network are transmitted back into the smart speaker to adjust noise reduction, Voice enhancement, Selected Sounds notification, Karaoke function to reduce voices from music.

Example 36 includes the method of example 34, or some other example herein, wherein the user feedback is collected from the list of an App on a mobile phone, Voice Commands, Voice messages, Button push or head and/or body motion movements.

Example 37 includes the method of example 34, or some other example herein, wherein the user sound quality feedback is transmitted up to a database located in a server. On the server a neural network is running in realtime and predicting the optimal sound processor unit parameters based on the user sound quality feedback stored in the database. The predicted parameters from the neural network are transmitted back into the smart speaker and Equalizer parameters are adjusted (Bass, treble, mid-tone, etc).

Example 38 includes a method of operating the Smart Speaker of example 1, or some other example herein, wherein the sound level is recorded, sent to the database, displayed on map services such as google maps and used to indicate sound levels in cafes and restaurants.

Example 39 includes a method of activating a IFTTT command by either a voice command, button on smart speaker or mobile App. Speak into the smart speaker what you want to configure of IFTTT devices. The command is sent to the database and then interpreted by AI and sent back to user for confirmation before activation.

Example 40 includes an electronic device comprising: a sensor to identify an environmental condition related to a location in which the electronic device is positioned; a processor to identify, based on a neural network, a sound-related parameter related to the environmental condition; and a speaker to generate a sound based on the sound-related parameter.

Example 41 includes the electronic device of example 40, or some other example herein, wherein the sensor is a microphone.

Example 42 includes the electronic device of example 40, or some other example herein, wherein the environmental condition relates to a characteristic of a user of the electronic device.

Example 43 includes the electronic device of example 40, or some other example herein, wherein the environmental condition relates to a sound level of the location.

Example 44 includes the electronic device of example 40, or some other example herein, wherein the environmental condition relates to a characteristic of a sound at the location.

Example 45 includes the electronic device of example 40, or some other example herein, wherein the environmental condition relates to an acoustic characteristic of the location.

Example 46 includes the electronic device of example 40, or some other example herein, wherein the processor includes a sound processor that is to generate the parameter.

Example 47 includes the electronic device of example 46, or some other example herein, wherein the sound processor is a filter or an equalizer.

Example 48 includes the electronic device of example 40, or some other example herein, wherein the parameter is a directional parameter related to a directional characteristic of the sound.

Example 49 includes the electronic device of example 48, or some other example herein, wherein the directional characteristic is related to rotation of the speaker or beamforming of the sound.

Example 50 includes the electronic device of example 40, or some other example herein, wherein the processor is to run at least a portion of the neural network.

Example 51 includes the electronic device of example 40, or some other example herein, wherein the processor is to identify a data from the neural network that is received from a device that is remote from the electronic device.

Example 52 includes one or more non-transitory computer-readable media comprising instructions that, upon executions of the instructions by a processor of an electronic device that includes a speaker, are to cause the electronic device to: identify an instruction by a user of the electronic device; identify a sound that is to be generated by the speaker; alter, based on the instruction, the sound to generate an altered sound; and generate, by the speaker, the altered sound.

Example 53 includes the one or more non-transitory computer-readable media of example 52, or some other example herein, wherein the instruction is an audio instruction provided by the user.

Example 54 includes the one or more non-transitory computer-readable media of example 52, or some other example herein, wherein the instruction is provided by the user to a user interface (UI).

Example 55 includes the one or more non-transitory computer-readable media of example 54, or some other example herein, wherein the UI is a UI of a device that is separate from the electronic device.

Example 56 includes the one or more non-transitory computer-readable media of example 52, or some other example herein, wherein the alteration is a change to a frequency of the sound to produce the altered sound.

Example 57 includes the one or more non-transitory computer-readable media of example 52, or some other example herein, wherein the alteration is a change of volume of a portion of the sound to produce the altered sound.

Example 58 includes the one or more non-transitory-computer-readable media of example 52, or some other example herein, wherein the alteration is to be performed by a neural network that is running on the processor.

Example 59 includes an electronic device comprising: a speaker to generate a sound that is based on a sound-related parameter provided by a neural network; a sensor coupled with the speaker, wherein the sensor is to detect an environmental condition of an environment in which the electronic device is located; and a processor that is to process the environmental condition to identify an environmental data; wherein the neural network is to update the sound-related parameter based on the environmental data.

Example 60 includes the electronic device of example 59, or some other example herein, wherein the processor is to run at least a portion of the neural network.

Example 61 includes the electronic device of example 59, or some other example herein, wherein the processor is to facilitate transmission of an indication of the environmental data to a database that is remote from the electronic device.

Example 62 includes the electronic device of example 59, or some other example herein, wherein the processor is to facilitate presentation of an indication of the environmental condition to a user of the electronic device.

Example 63 includes the electronic device of example 59, or some other example herein, wherein the sensor is a microphone.

Example 64 includes the electronic device of example 59, or some other example herein, wherein the sensor is a camera.

Example 65 includes the electronic device of example 59, or some other example herein, wherein the sensor is an accelerometer.

Example 66 includes one or more non-transitory computer-readable media comprising instructions that, upon execution of the instructions by a processor of an electronic device, are to cause the electronic device to: identify, based on one or more microphones of the electronic device, an instruction given by a user of the electronic device; identify, based on the instruction, a user-identifiable parameter related to the user; identify, based on the user-identifiable parameter, an acoustic filter; apply the acoustic filter to the instruction to generate a filtered instruction; and process the filtered instruction.

Example 67 includes the one or more non-transitory computer-readable media of example 66, or some other example herein, wherein the user-identifiable parameter relates to the age of the user.

Example 68 includes the one or more non-transitory computer-readable media of example 66, or some other example herein, wherein the user-identifiable parameter relates to the gender of the user.

Example 69 includes the one or more non-transitory computer-readable media of example 66, or some other example herein, wherein the user-identifiable parameter relates to the identity of the user.

Example 70 includes the one or more non-transitory computer-readable media of example 66, or some other example herein, wherein the acoustic filter relates to an equalizer or a volume control.

Example 71 includes an apparatus comprising one or more processors, active or passive circuitry, logic, hardware, software, or software, configured to perform all or part of the techniques described in or related to any of examples 1-70, or some other technique herein.

Example 72 includes a method related to all or part of the techniques of any of examples 1-70, or some other technique herein.

Example 73 includes one or more non-transitory computer-readable media comprising instructions that, upon execution of the instructions by one or more processors or other active or passive circuitry, logic, hardware, firmware, or software, are to cause the processors, circuitry, logic, hardware, firmware, or software to perform all or part of the techniques described in or related to any of examples 1-70, or some other technique herein.

Example 74 includes an apparatus comprising means to perform all or part of the techniques described in or related to any of examples 1-70, or some other technique herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. An electronic device comprising:
a sensor to identify an environmental condition related to a location in which the electronic device is positioned;
a processor to identify, based on a neural network, a sound-related parameter related to the environmental condition; and
a speaker to generate a sound based on the sound-related parameter.

2. The electronic device of claim 1, wherein the sensor is a microphone.

3. The electronic device of claim 1, wherein the environmental condition relates to a characteristic of a user of the electronic device, a sound level of the location, a characteristic of a sound at the location, or an acoustic characteristic of the location.

4. The electronic device of claim 1, wherein the processor includes a sound processor that is to generate the parameter.

5. The electronic device of claim 4, wherein the sound processor is a filter or an equalizer.

6. The electronic device of claim 1, wherein the parameter is a directional parameter related to a directional characteristic of the sound.

7. The electronic device of claim 6, wherein the directional characteristic is related to rotation of the speaker or beamforming of the sound.

8. The electronic device of claim 1, wherein the processor is to run at least a portion of the neural network.

9. The electronic device of claim 1, wherein the processor is to identify a data from the neural network that is received from a device that is remote from the electronic device.

10. One or more non-transitory computer-readable media comprising instructions that, upon executions of the instructions by a processor of an electronic device that includes a speaker, are to cause the electronic device to:
identify an instruction by a user of the electronic device;
identify a sound that is to be generated by the speaker;
alter, based on the instruction, the sound to generate an altered sound; and
generate, by the speaker, the altered sound.

11. The one or more non-transitory computer-readable media of claim 10, wherein the instruction is an audio instruction provided by the user.

12. The one or more non-transitory computer-readable media of claim 10, wherein the instruction is provided by the user to a user interface (UI).

13. The one or more non-transitory computer-readable media of claim 12, wherein the UI is a UI of a device that is separate from the electronic device.

14. The one or more non-transitory computer-readable media of claim 10, wherein the alteration is a change to a frequency of the sound or a change of volume of a portion of the sound to produce the altered sound.

15. The one or more non-transitory-computer-readable media of claim 10, wherein the alteration is to be performed by a neural network that is running on the processor.

16. An electronic device comprising:
a speaker to generate a sound that is based on a sound-related parameter provided by a neural network;
a sensor coupled with the speaker, wherein the sensor is to detect an environmental condition of an environment in which the electronic device is located; and
a processor that is to process the environmental condition to identify an environmental data;
wherein the neural network is to update the sound-related parameter based on the environmental data.

17. The electronic device of claim 16, wherein the processor is to run at least a portion of the neural network.

18. The electronic device of claim 16, wherein the processor is to facilitate transmission of an indication of the environmental data to a database that is remote from the electronic device.

19. The electronic device of claim 16, wherein the processor is to facilitate presentation of an indication of the environmental condition to a user of the electronic device.

20. The electronic device of claim 16, wherein the sensor is a microphone, a camera, or an accelerometer.

21. One or more non-transitory computer-readable media comprising instructions that, upon execution of the instructions by one or more processors of an electronic device, are to cause the electronic device to:
detect, by a sensor of the electronic device, an environmental condition of an environment in which the electronic device is located;
process the environmental condition to identify an environmental data;
identify a sound-related parameter provided by a neural network, wherein the sound-related parameter is based on the environmental data; and
facilitate generation of a sound that is based on the sound-related parameter.

22. The one or more non-transitory computer-readable media of claim 21, wherein the instructions are further to execute, on the one or more processors, at least a portion of the neural network.

23. The one or more non-transitory computer-readable media of claim 21, wherein the instructions are further to transmit an indication of the environmental data to a database that is remote from the electronic device.

24. The one or more non-transitory computer-readable media of claim 21, wherein the instructions are further to present an indication of the environmental condition to a user of the electronic device.

25. The one or more non-transitory computer-readable media of claim 21, wherein the sensor is a microphone, a camera, or an accelerometer.

* * * * *